United States Patent
Lunttila et al.

(10) Patent No.: US 11,785,640 B2
(45) Date of Patent: Oct. 10, 2023

(54) TRANSMISSION MANAGEMENT

(71) Applicant: Nokia Technologies Oy, Espoo (FI)

(72) Inventors: Timo Erkki Lunttila, Espoo (FI); Frank Frederiksen, Klarup (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/067,083

(22) Filed: Oct. 9, 2020

(65) Prior Publication Data
US 2021/0112593 A1    Apr. 15, 2021

(30) Foreign Application Priority Data

Oct. 10, 2019 (EP) .................................... 19202395

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01)

(58) Field of Classification Search
CPC ............. H04W 74/0808; H04W 16/14; H04W 74/002; H04B 7/026
USPC ......................................................... 370/329
See application file for complete search history.

(56) References Cited

U.S. PATENT DOCUMENTS

| | | | |
|---|---|---|---|
| 2016/0007368 A1* | 1/2016 | Moon | H04W 56/00 370/329 |
| 2016/0345206 A1* | 11/2016 | Yerramalli | H04L 5/0053 |
| 2017/0034670 A1 | 2/2017 | Zhang | |
| 2019/0191456 A1* | 6/2019 | Koorapaty | H04W 74/0808 |
| 2020/0196345 A1* | 6/2020 | Gupta | H04L 5/0055 |
| 2021/0075579 A1* | 3/2021 | Liu | H04L 5/0055 |
| 2021/0345407 A1* | 11/2021 | Myung | H04L 27/2607 |

FOREIGN PATENT DOCUMENTS

| | | | | |
|---|---|---|---|---|
| JP | WO 2019/160741 | * | 8/2019 | |
| WO | WO 2019160741 | | 8/2019 | |
| WO | WO-2019160741 A1 | * | 8/2019 | ........... H04L 5/0048 |

* cited by examiner

*Primary Examiner* — Kwang B Yao
*Assistant Examiner* — Syed M Bokhari
(74) *Attorney, Agent, or Firm* — Mintz Levin Cohn Ferris Glovsky and Popeo, P.C.

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to participate in a cooperative wireless transmission of a data block with peer apparatuses, wherein the cooperative transmission comprises an early transmit opportunity and a late transmit opportunity starting after the early transmit opportunity starts, wherein the cooperative transmission may comprise at least one further late transmission opportunity starting after the late transmit opportunity, perform a listen-before-talk test to check, if first radio resources are available, and responsive to the listen-before-talk test indicating the first resources are available, initiate a transmission of a data block on the first radio resources during the early transmit opportunity.

14 Claims, 6 Drawing Sheets

X - FAIL LBT

☐ EARLY

▦ LATE

TRANSMISSION MANAGEMENT

CROSS REFERENCE TO RELATED APPLICATIONS

This application claims priority to European patent application no. 19202395.0, filed on Oct. 10, 2019, entitled "TRANSMISSION MANAGEMENT," the contents of which are incorporated herein by reference in its entirety for all purposes.

FIELD

The present disclosure pertains to the field of wireless transmission in shared radio bands.

BACKGROUND

Broadcasting information comprises providing information to a group, possibly an undefined group of recipients. Broadcasting may comprise, for example, facilitating distribution of the same data, such as a video stream, to a large number of receivers at the same time. A broadcasting scenario may be a stadium or a shopping mall, where a single party, such as an operator or a venue owner, has deployed a relatively large number of synchronized small cells providing partially overlapping coverage. Moreover, as unlicensed radio spectrum may be used, for example at 5 GHz bands, interference from other devices, such a Wi-Fi access points or Wi-Fi mobile stations, may occur on the same unlicensed channel or carrier.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to participate in a cooperative wireless transmission of a data block with peer apparatuses, wherein the cooperative transmission comprises an early transmit opportunity and a late transmit opportunity starting after the early transmit opportunity starts, wherein the cooperative transmission may comprise at least one further late transmission opportunity starting after the late transmit opportunity, perform a listen-before-talk test to check, if first radio resources are available, and responsive to the listen-before-talk test indicating the first resources are available, initiate a transmission of a data block on the first radio resources during the early transmit opportunity.

According to a second aspect of the present disclosure, there is provided a method, comprising participating, by an apparatus, in a cooperative wireless transmission of a data block with peer apparatuses, wherein the cooperative transmission comprises an early transmit opportunity and a late transmit opportunity starting after the early transmit opportunity starts, wherein the cooperative transmission may comprise at least one further late transmission opportunity starting after the late transmit opportunity, performing a listen-before-talk test to check, if first radio resources are available, and responsive to the listen-before-talk test indicating the first resources are available, initiating a transmission of a data block on the first radio resources during the early transmit opportunity.

According to a third aspect of the present disclosure, there is provided an apparatus comprising means for participating in a cooperative wireless transmission of a data block with peer apparatuses, wherein the cooperative transmission comprises an early transmit opportunity and a late transmit opportunity starting after the early transmit opportunity starts, wherein the cooperative transmission may comprise at least one further late transmission opportunity starting after the late transmit opportunity, performing a listen-before-talk test to check, if first radio resources are available, and responsive to the listen-before-talk test indicating the first resources are available, initiating a transmission of a data block on the first radio resources during the early transmit opportunity.

According to a fourth aspect of the present disclosure, there is provided a non-transitory computer readable medium having stored thereon a set of computer readable instructions that, when executed by at least one processor, cause an apparatus to at least participate in a cooperative wireless transmission of a data block with peer apparatuses, wherein the cooperative transmission comprises an early transmit opportunity and a late transmit opportunity starting after the early transmit opportunity starts, wherein the cooperative transmission may comprise at least one further late transmission opportunity starting after the late transmit opportunity. perform a listen-before-talk test to check, if first radio resources are available, and responsive to the listen-before-talk test indicating the first resources are available, initiate a transmission of a data block on the first radio resources during the early transmit opportunity.

According to a fifth aspect of the present disclosure, there is provided a computer program configured to cause an apparatus at least to participate in a cooperative wireless transmission of a data block with peer apparatuses, wherein the cooperative transmission comprises an early transmit opportunity and a late transmit opportunity starting after the early transmit opportunity starts, wherein the cooperative transmission may comprise at least one further late transmission opportunity starting after the late transmit opportunity, perform a listen-before-talk test to check, if first radio resources are available, and responsive to the listen-before-talk test indicating the first resources are available, initiate a transmission of a data block on the first radio resources during the early transmit opportunity.

EMBODIMENTS

In accordance with the present disclosure, a set of transmitters may perform a broadcast of a data block by self-organizing themselves into plural groups of transmitters, which transmit the data block in a way which avoids interference present on radio resources used in the broadcast. A listen-before-talk test may be used by the transmitters in the self-organizing process, such that the transmitters may adaptively assign themselves to distinct groups to avoid interference and perform the broadcast in an organized manner. Transmissions are conducted by the groups of transmitters in early and late transmit opportunities.

In a first embodiment, a listen-before-talk test is performed before an early transmit opportunity begins, and transmitters succeeding in this test use the early transmit opportunity. Transmitters failing the test use the late transmit opportunity. In a second embodiment, the transmitters are already divided into early and late transmitters. The late transmitters perform a listen-before-talk test during the early transmit opportunity before their late transmit opportunity begins, and in case the test succeeds, they may use the early transmit opportunity and thereafter consider themselves configured to use the early transmit opportunity. The embodiments may be combined, such that the allocation of transmitters to early and late groups is initially performed using the first embodiment.

Figure 1:
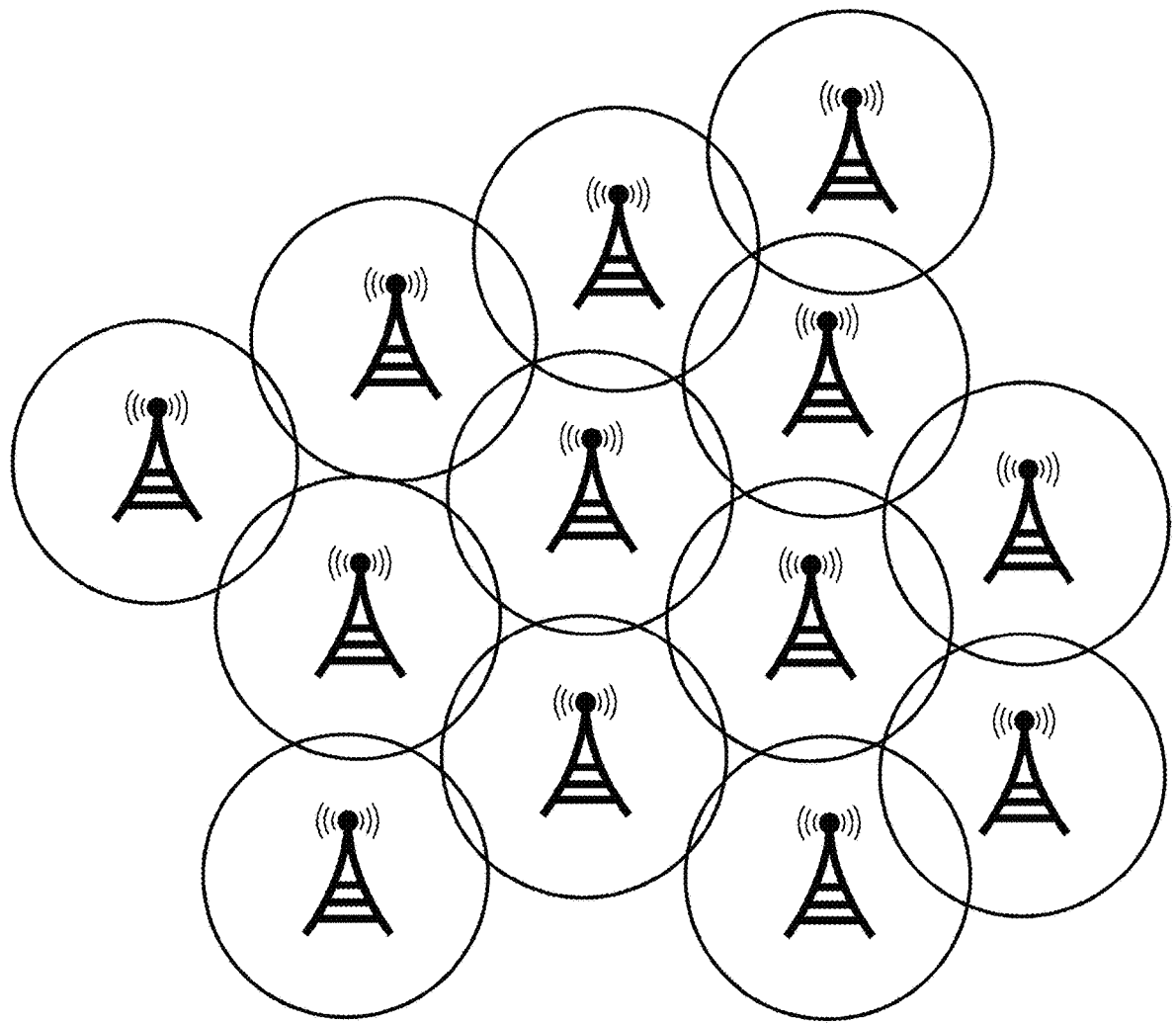
FIG. 1 illustrates an example system in accordance with at least some embodiments of the present invention.

FIG. 1 illustrates an example system in accordance with at least some embodiments of the present invention. Plural base stations or access points are illustrated, as well as their respective coverage areas, which are seen to partly overlap in several places. The expression "base station" will be used in the present document, by which nodes usually referred to as access points are not to be excluded. Often, the term "base station" is used of cellular technology such as new radio, NR, or long term evolution, LTE, and the term "access point" of non-cellular technology, such as Wi-Fi or worldwide interoperability for microwave access, WiMAX. Radio technology such as NR, operation in unlicensed spectrum, NR-U, as well as possible further releases of LTE Licensed Assisted Access, LAA, and MulteFire, for example in releases MF1.x and/or MF2.0, may be considered in broadcasting. A same data block may be provided to the base stations for broadcast in their respective coverage areas, to receivers such as user equipments in the respective coverage areas. The base stations may be seen as peer apparatuses to each other.

Broadcast services such as video streaming rely in general on rather frequent and periodic delivery of content to a group of users. Although some degree of data buffering may be used, it is not desirable to have significant interruptions in transmissions, or otherwise there may be service outage, or at least degradation in service quality seen by users. While use of unlicensed spectrum is an attractive alternative for service providers to deliver multicast services as cost- and license-free spectrum allows for inexpensive and rapid deployment of networks, interference from other radio nodes operating on the same radio resources, such as carrier(s) or channel(s) needs attention. In general, radio resources may comprise radio channels, carriers, timeslots and spreading codes. Operation on the 5 GHz unlicensed spectrum, for example, is subject to channel access rules often referred to as listen-before-talk, LBT. The LBT requirement essentially means, in general, that prior to transmitting on the unlicensed spectrum, a node needs to listen on the given operating channel for a short period of time to verify that no other node is already transmitting on that channel. This listening may be referred to as an LBT test. For example, the listening may comprise measuring, if energy can be detected on the channel(s) and/or carrier(s) the node desires to use. The test may apply a threshold, with a failed LBT test occurring when more than the threshold amount of energy is detected on the channel(s) and/or carrier(s) the node desires to use. A successful LBT test is one where the amount of energy detected on the channel(s) and/or carrier(s) the node desires to use is less than the threshold.

Different types of LBT have been defined for NR-unlicensed, as will be summarized below. When operating, prior to its transmission, a base station may perform a Cat4 LBT, and provided that this LBT is successful, it may start a channel occupancy, COT. The maximum channel occupancy, before having to perform another Cat 4 LBT may be 6-10 milliseconds, for example. The base station may share its channel occupancy with a responding device, such that the responding device, which may be a user equipment, UE, does not need to perform a Cat4 LBT—instead a single Cat2 LBT or even no LBT (that is, Cat1 access) may suffice.

If absence of Wi-Fi cannot be guaranteed in the band (e.g. sub-7 GHz) where NR-unlicensed, NR-U, is operating, LBT may be used. A baseline assumption is that NR-unlicensed operating bandwidth is an integer multiple of 20 MHz. For a channel access mechanism to use in NR-U, the LTE licensed assisted access, LTE-LAA, LBT mechanism may be adopted as a baseline for 5 GHz band and/or 6 GHz band.

For a 5 GHz band, having a 16 µs gap to accommodate for the transceiver turnaround before the immediate transmission of the responding node is beneficial for NR-U, such as for supporting fast feedback, and is permitted in regulations. Restrictions on when this option can be used may be further identified, for example in consideration of fair coexistence.

| | Cat 2 LBT | Cat 4 LBT |
|---|---|---|
| DRS alone or multiplexed with non-unicast data | When the DRS duty cycle ≤1/20, and the total duration is up to 1 ms: 25 µs Cat 2 LBT is used (as in LAA) | When DRS duty cycle is >1/20, or total duration >1 ms |
| DRS multiplexed with unicast data | N/A | Channel access priority class is selected according to the multiplexed data |
| PDCCH and PDSCH | N/A | Channel access priority class is selected according to the multiplexed data |

The channel access schemes for access for unlicensed spectrum can be classified into the following categories. In Category 1, immediate transmission may be started after a short switching gap. This is used for a transmitter to immediately transmit after a switching gap inside a COT. The switching gap from reception to transmission is to accommodate the transceiver turnaround time and is no longer than 16 µs, for example. In Category 2, LBT without random back-off is conducted. The duration of time that the channel is sensed to be idle before the transmitting entity transmits is deterministic. The back-off represents a time the node will wait before trying to access the radio resources again. In Category 3, LBT with random back-off with a contention window of fixed size. In this case, the transmitting entity draws a random number N within a contention window to select the back-off time period. The size of the contention window is specified by the minimum and maximum value of N. The size of the contention window is fixed. The random number N is used in the LBT procedure to determine the duration of time that the channel is sensed to be idle before the transmitting entity transmits on the channel. Finally, in Category 4, LBT with random back-off with a contention window of variable size is performed. In this case, the transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

Another type of LBT supported by ETSI harmonized standard EN 301 893 is frame based equipment, FBE. In FBE, the possible starting points for a transmission by the device initiating a channel occupancy are predetermined and occur regularly with a periodicity of a fixed frame period. For FBE mode of operation, the base station acquires a COT with Cat2 LBT immediately prior to the fixed frame period. Within the base station has acquired the COT, if a gap is <=16 µs, Cat 1 channel access scheme can be used by the base station and its associated UEs. Within the base station acquired COT, if a gap is larger than 16 µs, Cat 2 LBT should be used by the base station and its associated UEs.

In this disclosure, a framework for performing coordinated broadcast transmissions (for example multicast-broadcast single-frequency network, MBSFN) on unlicensed spectrum is presented, which is in line with regulatory frameworks related to channel access and LBT. The base stations may perform in accordance with load based equipment, LBE, or frame based equipment, FBE, rules.

Figure 2A:
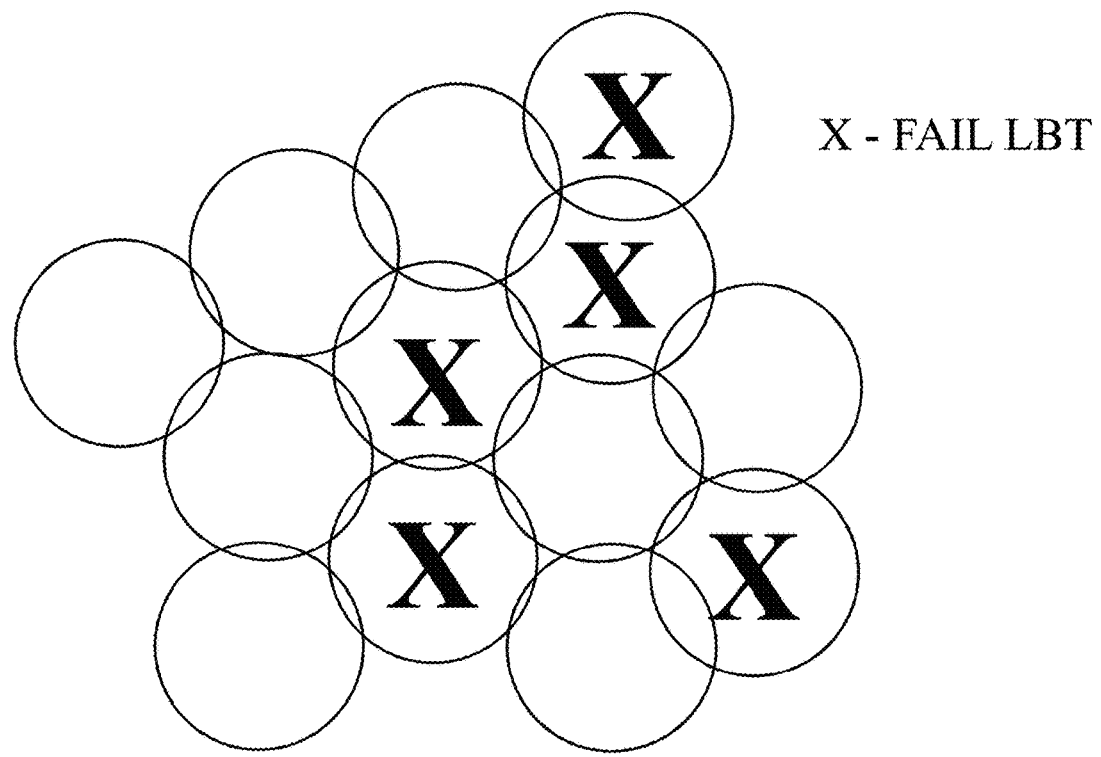
FIG. 2A illustrates a first stage in a first embodiment of the present invention.

FIG. 2A illustrates a first stage in a first embodiment of the present invention. The coverage areas of FIG. 2A may correspond to those of FIG. 1. For the sake of clarity, the base stations themselves are not illustrated in FIG. 2A. In FIG. 2A, a set of transmitters are to perform a cooperative wireless broadcast of a data block, wherein the cooperative broadcast comprises an early transmit opportunity and a late transmit opportunity starting after the early transmit opportunity starts. The early and late transmit opportunities may be repeating at fixed intervals. In each interval, the early transmit opportunity starts before the late transmit opportunity. The transmitters may be time-synchronized, by which it is meant they are able to know timings of radio frames in the system. The transmitters may be seen as peer apparatuses to each other. It should be noted that the early and late transmit opportunities discussed in this disclosure are merely exemplary, and may be extended to multiple transmit opportunities that are time-wise coupled such that the transmit opportunity is switched from one group to a second group, which may further switch the transmit opportunity to a third group.

Initially, all the transmitters perform an LBT test to determine, if radio resources to be used for the broadcast are available to them. Some transmitters succeed in their LBT, while others fail. Potential reasons for the failure include presence of a local Wi-Fi transmission nearby, and presence of spurious transmissions which affect the LBT listening phase. The transmitters which, in this example, fail the LBT are crossed over with an "X" in FIG. 2A.

Figure 2B:
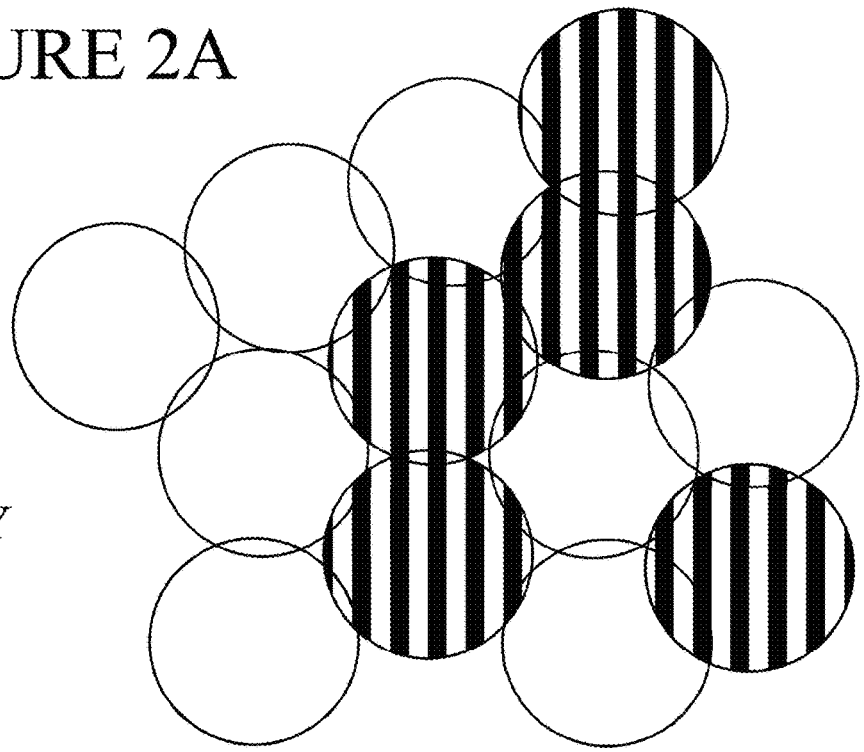
FIG. 2B illustrates a second stage in a first embodiment of the present invention.

FIG. 2B illustrates a second stage in the first embodiment of the present invention. In this stage, the division of the set of transmitters into two groups has been performed based on the results of the LBT processes of FIG. 2A. In detail, the transmitters of the set which succeeded in their LBT are assigned to a group which will use the early transmit opportunity. The transmitters of the set which failed in their LBT are assigned to a group which will use the late transmit opportunity. Transmitters in the early group may provide a signal to transmitters in the late group, the transmission indicating when their transmission will end. This signal may be provided via a backbone network interconnecting the set of transmitters or via separate second radio resources, for example. The signal may be provided over the air along with the data block, for example in a separate message multiplexed with the data block. The signal may comprise the indication as an indicated frame, an indicated expected time, or intended frame boundary, or merely as indicating that the transmission is ongoing during the current frame, and will end at the close of the current frame. In general, the signal may indicate when the early group will end its transmission. Transmitters in the late group may react to the signal by initiating their transmission in the late transmit opportunity, which may occur promptly after the early transmit opportunity, for example. For example, the late group transmitters may begin transmitting at most 8 or 16 microseconds after the end of the early transmit opportunity. In this case, the late group may start transmitting without performing a second LBT, in effect sharing the channel occupancy with the early group. In subsequent frames, the transmitters may maintain their assignment to the early and late groups.

Figure 3A:
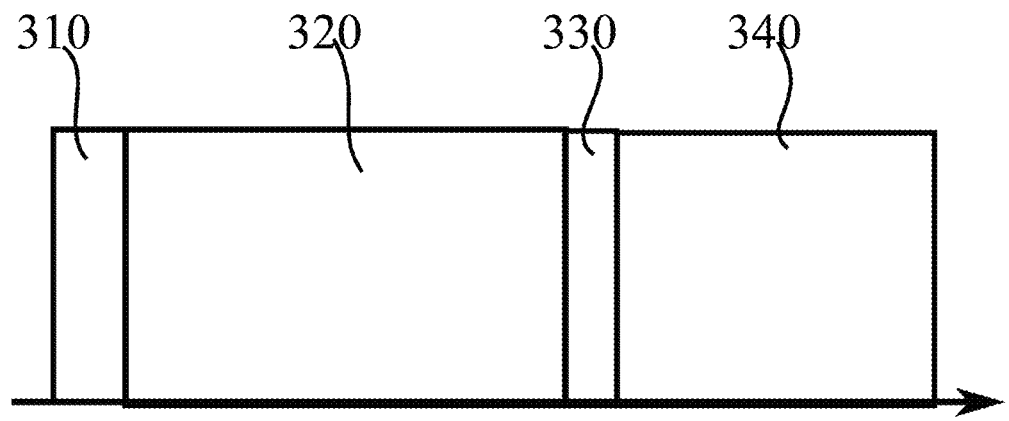
FIG. 3A illustrates timing in the first embodiment.

FIG. 3A illustrates timing in the first embodiment. In phase 310, the set of transmitters each perform an LBT, as described above. In phase 320, the transmitters which succeed in their LBTs form the early group and perform their transmission. In this phase the transmitters of the early group, or at least a subset, or at least one of them, may provide a signal to the late group concerning the transmission of the early transmit opportunity. This signal provides the benefit that the late group can share the COT by starting their transmission promptly after the early group stops transmitting. The late group may start their transmission without performing an LBT process. Phase 330 is a gap between transmissions of the early and late group, which may be, for example, at most 16 microseconds or, in other embodiments, at most 8 microseconds. The late group transmits in phase 340.

Figure 3B:
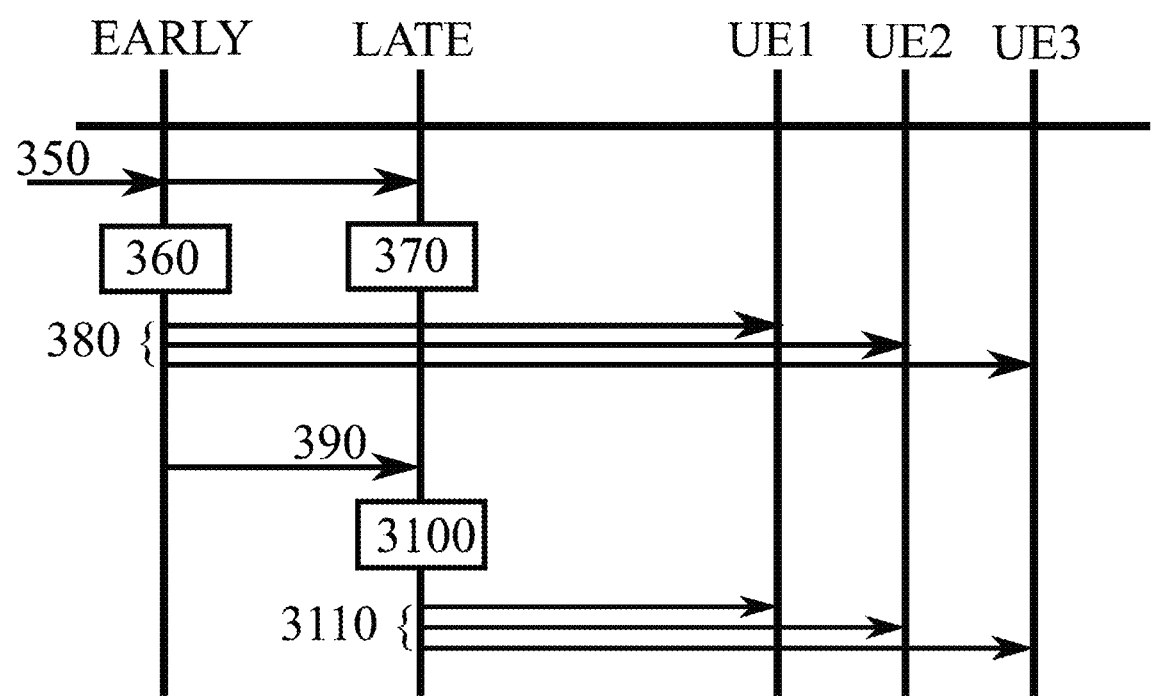
FIG. 3B is a signalling diagram relating to the first embodiment.

FIG. 3B is a signalling diagram relating to the first embodiment. On the vertical axes are disposed, from the left to the right, the early group of transmitters, the late group of transmitters, and receivers UE1-UE3 which are disposed within the coverage areas to the transmitters in general.

In phase 350, an instruction to broadcast a data block is received, for example from a network operator. Phase 350 may comprise provision of the data block to the transmitters, or, for example, the transmitters may be provided a link enabling them to download the data block from a network location. Phase 350 may also include providing an indication of the radio resources to be used in the broadcasting. Responsively, each transmitter in the set conducts an LBT test, as is described above, in phases 360 and 370, respectively. The LBTs of the early group, phase 360, succeed (and this success in fact defines the early group, as described above). On the other hand, the late group is defined as the transmitters whose LBTs fail, phase 370. In other words, in the first embodiment, the split to early and late group does not exist before the LBTs of phases 360 and 370. Responsive their successful LBTs of phase 360, the early group broadcasts in phase 380, and provides a signal to the late group in phase 390, which may take place during the broadcasting of phase 380. The late group receives signal 390 and determines, phase 3100, when the early group will stop broadcasting. The late group can then begin broadcasting, phase 3110, promptly upon the end of the early group broadcast. In some embodiments, the late group may start broadcasting without performing an LBT. Expressed in other words, the late group may transmit and access the radio resources of the channel used, responsive to their failed LBT and the signal of phase 390. Thus, a channel occupancy may be shared between the set of transmitters, even though some of them failed their LBT.

In one embodiment the transmit timing of the various groups is configured such that concurrent transmissions are allowed. That is, nodes in the late group may be instructed by nodes in the early group to initiate their transmissions, even when downlink transmissions by the early group have not yet been completed. Such concurrent transmissions from overlapping groups may increase interference in the network, but would potentially also increase the capacity of the system.

Figure 4A:
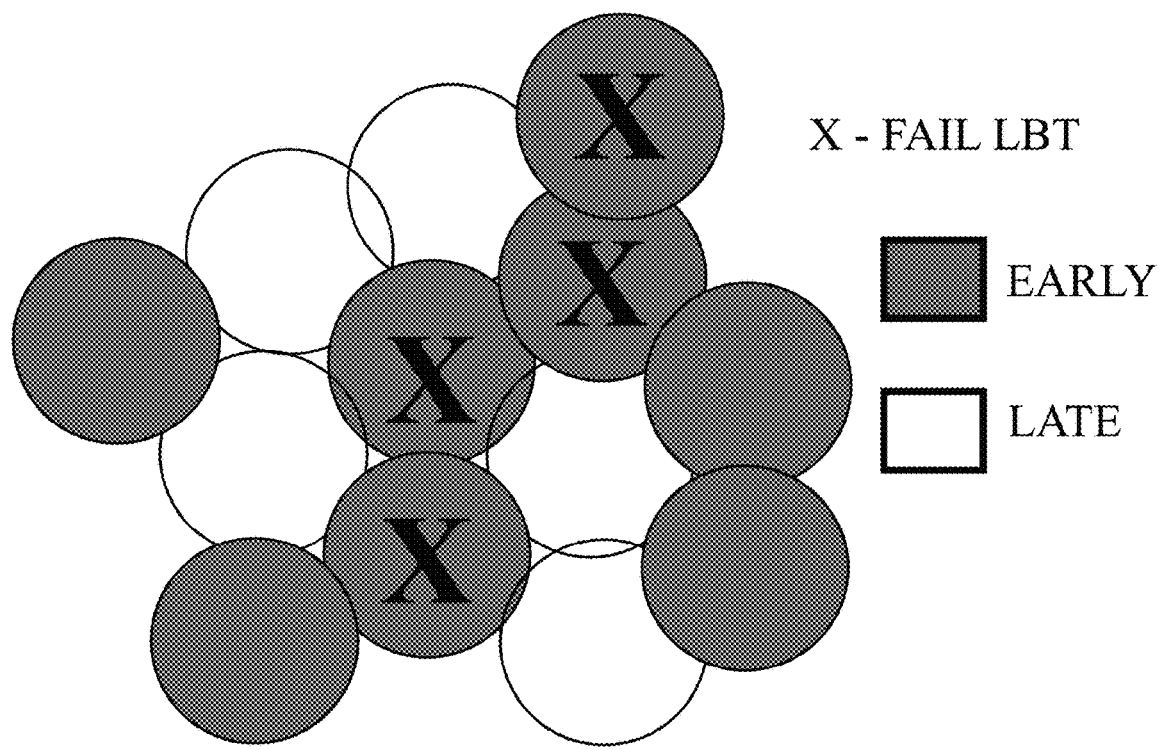
FIG. 4A illustrates a first stage in a second embodiment of the present invention.

FIG. 4A illustrates a first stage in a second embodiment of the present invention. In the second embodiment, the transmitters have already been assigned to the early and late groups, for example by using the first embodiment. In FIG. 4A, the early group is illustrated as shaded in grey, and the late group is illustrated as white. In the second embodiment, the early group starts by performing LBT on the radio resources to be used, and in case the LBT is successful, members of the early group proceed to start their broadcast. However, in case LBT is fails, these transmitters do not join the broadcast of the early transmit opportunity and instead join the late group. The early-group transmitters which fail their LBT are marked with an "X" in FIG. 4A.

The late group of transmitters is, in the second embodiment, configured to perform an LBT during the early transmit opportunity, for example a few symbols or slots after the early group begins transmitting. As the transmitters "X" in FIG. 4A do not transmit, they may by doing so provide an opportunity for some late-group transmitters to join the early group. In detail, of the late-group transmitters those who succeed in their LBT join the early group and transmit during the early transmit opportunity, starting their transmissions before the late transmit opportunity begins. The late-group transmitters which fail their initial LBTs do not transmit during the early transmit opportunity, and their transmission may even be unnecessary, since their LBT may fail for the reason that an early-group transmitter is transmitting the data block nearby, and receivers can receive it.

In the second embodiment, the early transmit opportunity begins before the late transmit opportunity, but the late transmit opportunity begins before the early transmit opportunity ends. In other words, the transmit opportunities partially overlap in time. An exception to this may be provided in cases where the first embodiment is used to initially assign the transmitters to the early and late groups, in which case the consecutive early and late transmit opportunities of the first embodiment, illustrated in FIG. 3A, may be used instead of overlapping transmit opportunities. A yet further alternative is that where the first embodiment is used to initially assign the transmitters to the early and late groups, the timing of the transmit opportunities of FIG. 3 is used for the first transmissions only, the transmit scheme then changing over to the overlapping transmit opportunities.

Figure 4B:
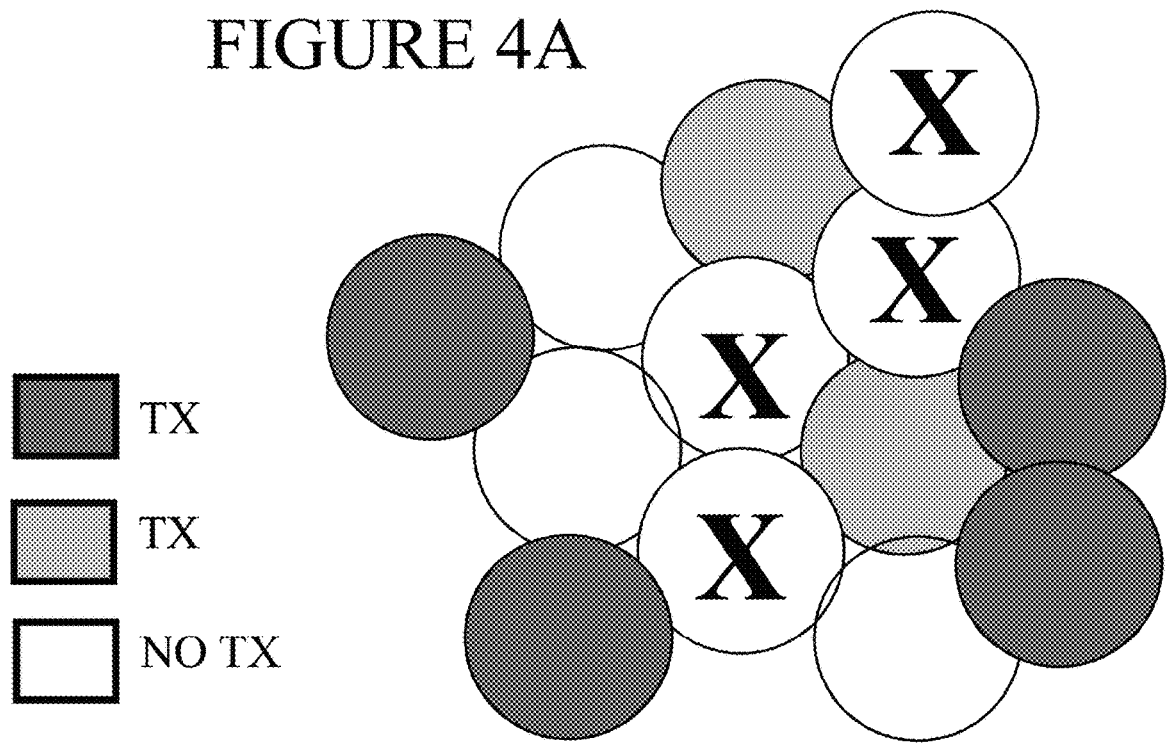
FIG. 4B illustrates a second stage in a second embodiment of the present invention.

FIG. 4B illustrates a second stage in the second embodiment of the present invention. In this stage, two of the late-group transmitters have succeeded in their LBT tests and have joined the transmission ("TX") of the early transmit opportunity, while the early-group transmitters which failed their LBTs in FIG. 4A have not joined. The situation illustrated in FIG. 4B is this one where the late transmit opportunity has not yet started, and transmitters not transmitting are labelled white ("NO TX").

In a later stage, at the start of the late transmit opportunity, the transmitters not transmitting ("NO TX") in FIG. 4B may perform LBTs and, if these are successful, broadcast the data block over the radio resources in the late transmit opportunity. For the next round the transmitters filled in dark or light grey in FIG. 4B will form the early group, and those filled white will form the late group.

The second embodiment may thus enable a dynamic self-organization among the transmitters, such that late-group transmitters may switch to the early group, and early-group transmitters may switch to the late group. Overall, a cooperative broadcast is achieved.

In general, relevant to both the first and second embodiments, the transmitters may be configured to select a type of LBT based at least in part on a traffic class of the data block and/or a contention window size. For example, where the traffic class indicates the data block is of high importance, a Cat4 LBT may be performed and where the traffic class indicates the data block is of lower importance, a Cat2 LBT may be performed. In general, an LBT with a longer listening period may be used in case the traffic class indicates the data block is more important, and a shorter listening period may be used in case the traffic class indicates the data block is less important. The broadcast transmissions may be conducted in accordance with NR or LTE technology, for example.

The disclosed technology overall provides the benefit of improved coverage and adaptive self-organization of broadcast networks, relevant for example to operation in an unlicensed or otherwise shared spectrum. In the first embodiment, a channel occupancy may be shared between the groups, and in the second embodiment an enhanced proportion of transmitters can use the early opportunity, providing the data to some recipients earlier. Transmitting sequentially increases the likelihood that LBT tests are successful, leading to transmission of actual data.

Figure 4C:
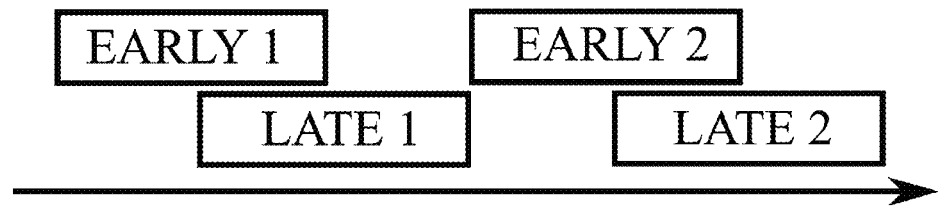
FIG. 4C illustrates timing of transmit opportunities in a variant of the second embodiment.

FIG. 4C illustrates timing of transmit opportunities in a variant of the second embodiment. Time advances from the left to the right, as indicated by the arrow. In this variant of the second embodiment, the early and late transmit opportunities overlap each time, as illustrated. A first early transmit opportunity transmission, EARLY_1 and a second early transmit opportunity transmission, EARLY 2, are illustrated. Likewise two late transmit opportunity transmissions, LATE 1 and LATE 2, are shown. In other variants of the second embodiment, the transmit opportunities don't overlap, but follow each other sequentially, in turn such that the late transmit opportunity follows the early one, for example in the same COT. An overlap is possible, since the transmitters are distributed to the early and late groups, and in general the early and late groups will not collide in the radio resources due to their geographical distance.

In some embodiments, the early and late transmit opportunities overlap in the sense that during the overlap, the early-group transmitters have stopped their downlink transmissions and receive uplink data while the late group transmits on the downlink.

While discussed herein primarily in the context of broadcasting, principles of the disclosed methods are also applicable to integrated access and backhaul, IAB, as defined by the 3$^{rd}$ generation partnership program, 3GPP. In IAB, a parent node and an IAB node, which is essentially a relay node, have a wireless backhaul connection with each other, and the IAB node may further convey data to UE(s) and/or another IAB nodes, denoted as child nodes. In the context of the present disclosure, transmitters of the early group could be seen as patent nodes, and transmitters of the late group could be seen as IAB nodes.

Figure 5:
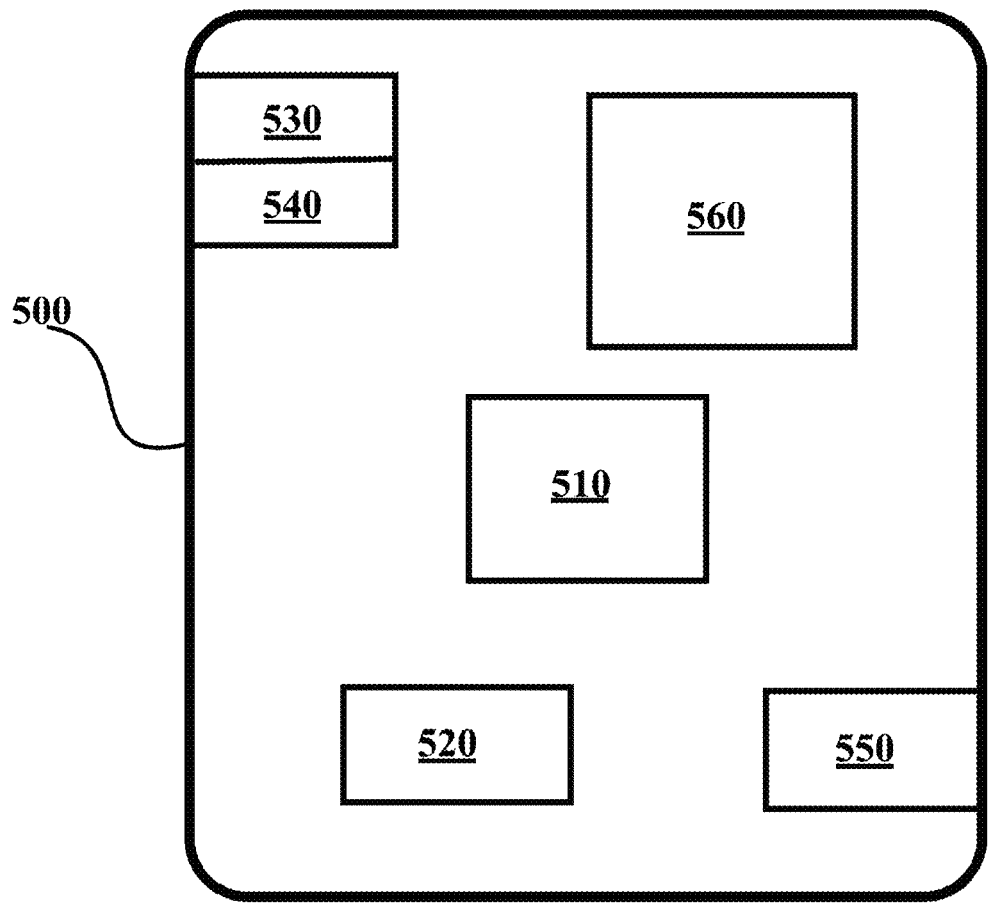
FIG. 5 illustrates an example apparatus capable of supporting at least some embodiments of the present invention.

FIG. 5 illustrates an example apparatus capable of supporting at least some embodiments of the present invention. Illustrated is device 500, which may comprise, for example, a transmitter or a base station. Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. A processing core may comprise, for example, a Cortex-A8 processing core manufactured by ARM Holdings or a Steamroller processing core designed by Advanced Micro Devices Corporation. Processor 510 may comprise at least one Qualcomm Snapdragon and/or Intel Atom processor. Processor 510 may comprise at least one application-specific integrated circuit, ASIC. Processor 510 may comprise at least one field-programmable gate array, FPGA. Processor 510 may be means for performing method steps in device 500, such as participating, performing and initiating. Processor 510 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with global system for mobile communication, GSM, wideband code division multiple access, WCDMA, 5G, which also known as NR, long term evolution, LTE, IS-95, wireless local area network, WLAN, Ethernet and/or worldwide interoperability for microwave access, WiMAX, standards, for example.

Device 500 may comprise a near-field communication, NFC, transceiver 550. NFC transceiver 550 may support at least one NFC technology, such as NFC, Bluetooth, Wibree or similar technologies.

Device 500 may comprise user interface, UI, 560. UI 560 may comprise at least one of a display, a keyboard, a touchscreen, a vibrator arranged to signal to a user by causing device 500 to vibrate, a speaker and a microphone. A user may be able to operate device 500 via UI 560, for example to configure the base station.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively to a serial bus, the transmitter may comprise a parallel bus transmitter. Likewise processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively to a serial bus, the receiver may comprise a parallel bus receiver.

Device 500 may comprise further devices not illustrated in FIG. 5. For example, where device 500 comprises a smartphone, it may comprise at least one digital camera. Some devices 500 may comprise a back-facing camera and a front-facing camera, wherein the back-facing camera may be intended for digital photography and the front-facing camera for video telephony. Device 500 may comprise a fingerprint sensor arranged to authenticate, at least in part, a user of device 500. In some embodiments, device 500 lacks at least one device described above. For example, some devices 500 may lack a NFC transceiver 550.

Processor 510, memory 520, transmitter 530, receiver 540, NFC transceiver 550 and/or UI 560 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

Figure 6:
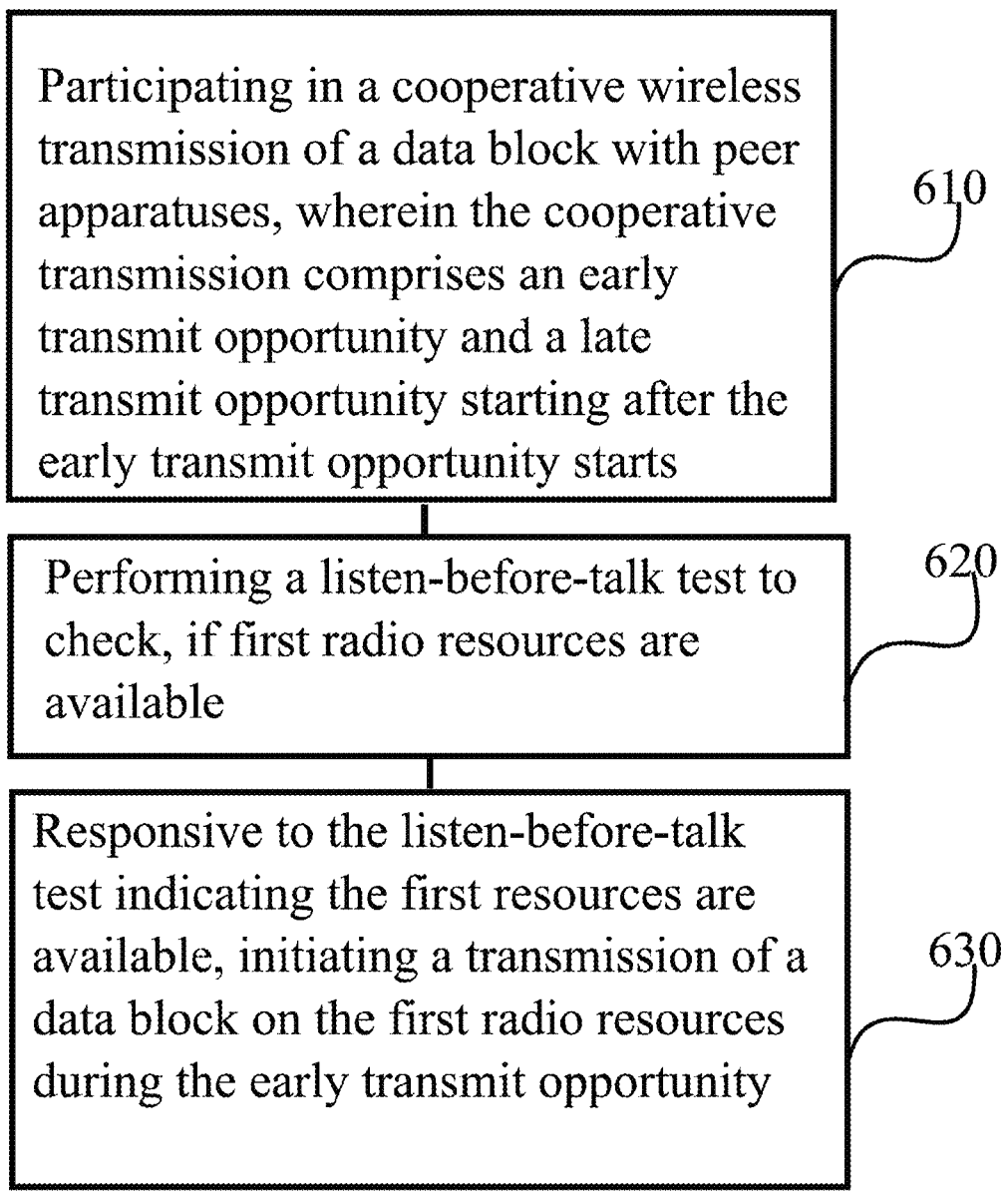
FIG. 6 is a flow graph of a method in accordance with at least some embodiments of the present invention.

FIG. 6 is a flow graph of a method in accordance with at least some embodiments of the present invention. The phases of the illustrated method may be performed in one of the transmitters, an auxiliary device or a personal computer, for example, or in a control device configured to control the functioning thereof, when installed therein.

Phase 610 comprises participating, by an apparatus, in a cooperative wireless transmission of a data block with peer apparatuses, wherein the cooperative transmission comprises an early transmit opportunity and a late transmit opportunity starting after the early transmit opportunity starts. The cooperative transmission may comprise at least one further late transmission opportunity starting after the late transmit opportunity. Phase 620 comprises performing a listen-before-talk test to check, if first radio resources are available. Phase 630 comprises, responsive to the listen-before-talk test indicating the first resources are available, initiating a transmission of a data block on the first radio resources during the early transmit opportunity. The cooperative wireless transmission may comprise a cooperative wireless broadcast.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing wireless networks.

ACRONYMS

DRS discovery signaling
ETSI European Telecommunications Standards Institute
PDCCH physical downlink control channel
PDSCH physical downlink shared channel
RACH random access channel

| REFERENCE SIGNS LIST | |
| --- | --- |
| 310 | LBT phase of FIG. 3A |
| 320 | Early transmit phase of FIG. 3A |
| 330 | Gap phase of FIG. 3A |
| 340 | Late transmit phase of FIG. 3A |
| 350-3110 | Phases of FIG. 3B |
| 500-560 | Structure of the device of FIG. 5 |
| 610-630 | Phases of FIG. 6 |

The invention claimed is:

1. An apparatus comprising at least one processing core, at least one memory including computer program code, the at least one memory and the computer program code being configured to, with the at least one processing core, cause the apparatus at least to:

participate in a cooperative wireless transmission of a data block with peer apparatuses comprising or comprised in one or more base stations, wherein the cooperative wireless transmission comprises an early transmit opportunity and a late transmit opportunity starting after the early transmit opportunity starts, wherein the cooperative wireless transmission comprises at least one further late transmission opportunity starting after the late transmit opportunity;

perform a listen-before-talk test to check, if first radio resources are available, and responsive to the listen-before-talk test indicating the first radio resources are available, provide a first signal to at least some of the peer apparatuses relating to the cooperative wireless transmission of the data block from the apparatus;

responsive to the listen-before-talk test indicating the first radio resources are available, initiate a transmission of the data block on the first radio resources during the early transmit opportunity;

responsive to the listen-before-talk test not indicating the first radio resources are available, listen for a second signal from at least one of the peer apparatuses, relating to the transmission of the data block from the at least one peer apparatuses, and initiate the transmission of the data block from the apparatus in accordance with the second signal from the at least one peer apparatuses by initiating the transmission less than or equal to a threshold length of time after the at least one peer apparatuses ends its transmission of the data block without performing a second listen-before-talk test after the at least one peer apparatuses ends its transmission of the data block.

2. An apparatus according to claim 1, wherein the apparatus is configured to use the late transmit opportunity and a subset of the peer apparatuses being configured to use the early transmit opportunity, the apparatus being further configured to:

perform the listen-before-talk test to check, if first radio resources are available after the early transmit opportunity has started and before the late transmit opportunity has started.

3. The apparatus according to claim 2, wherein the apparatus is further configured to, responsive to the listen-before-talk test indicating the first radio resources are available after the early transmit opportunity has started and before the late transmit opportunity has started, configure the apparatus to use the early transmit opportunity for subsequent data blocks.

4. The apparatus according to claim 2, wherein transmissions during the early transmit opportunity and the late transmit opportunity overlap each other, with the late transmit opportunity starting before the early transmit opportunity ends.

5. The apparatus according to claim 2, wherein the apparatus is further configured to, responsive to the listen-before-talk test indicating the first radio resources are not available during the early transmit opportunity, to perform a second listen-before-talk test before transmitting the data block over the first radio resources during the late transmit opportunity.

6. The apparatus according to claim 1, wherein the apparatus is further configured to select a type of the listen-before-talk test based at least in part on a traffic priority class of the data block and/or a contention window size, the selected type comprising a listen-before-talk test with or without a random back-off period.

7. The apparatus according to claim 1, wherein the first radio resources are unlicensed radio resources.

8. A method, comprising:

participating, by an apparatus, in a cooperative wireless transmission of a data block with peer apparatuses comprising or comprised in one or more base stations, wherein the cooperative wireless transmission comprises an early transmit opportunity and a late transmit opportunity starting after the early transmit opportunity starts, wherein the cooperative wireless transmission comprises at least one further late transmission opportunity starting after the late transmit opportunity;

performing a listen-before-talk test to check, if first radio resources are available, and responsive to the listen-before-talk test indicating the first radio resources are available, providing a first signal to at least some of the peer apparatuses relating to the cooperative wireless transmission of the data block from the apparatus;

responsive to the listen-before-talk test indicating the first radio resources are available, initiating a transmission of the data block on the first radio resources during the early transmit opportunity;

responsive to the listen-before-talk test not indicating the first radio resources are available, listening for a second signal from at least one of the peer apparatuses, relating to the transmission of the data block from the at least one peer apparatuses, and initiate the transmission of the data block from the apparatus in accordance with the second signal from the at least one peer apparatuses by initiating the transmission less than or equal to a threshold length of time after the at least one peer apparatuses ends its transmission of the data block without performing a second listen-before-talk test after the at least one peer apparatuses ends its transmission of the data block.

9. A method according to claim 8, wherein the apparatus is configured to use the late transmit opportunity and a subset of the peer apparatuses being configured to use the early transmit opportunity, the method further comprising:

performing the listen-before-talk test to check, if first radio resources are available after the early transmit opportunity has started and before the late transmit opportunity has started.

10. The method according to claim 9, further comprising, responsive to the listen-before-talk test indicating the first radio resources are available after the early transmit opportunity has started and before the late transmit opportunity has started, configuring the apparatus to use the early transmit opportunity for subsequent data blocks.

11. The method according to claim 9, wherein transmissions during the early transmit opportunity and the late transmit opportunity overlap each other, with the late transmit opportunity starting before the early transmit opportunity ends.

12. The method according to claim 9, further comprising, responsive to the listen-before-talk test indicating the first radio resources are not available during the early transmit opportunity, performing a second listen-before-talk test before transmitting the data block over the first radio resources during the late transmit opportunity.

13. The method according to claim 8, further comprising selecting a type of the listen-before-talk test based at least in part on a traffic class of the data block and/or a contention window size, the selected type comprising a listen-before-talk test with or without a random back-off period.

14. A non-transitory computer readable medium having stored thereon a set of computer readable instructions that, when executed by at least one processor, cause an apparatus to at least:

participate in a cooperative wireless transmission of a data block with peer apparatuses comprising or comprised in one or more base stations, wherein the cooperative wireless transmission comprises an early transmit opportunity and a late transmit opportunity starting after the early transmit opportunity starts, wherein the cooperative wireless transmission comprises at least one further late transmission opportunity starting after the late transmit opportunity;
perform a listen-before-talk test to check, if first radio resources are available, and
responsive to the listen-before-talk test indicating the first radio resources are available, provide a first signal to at least some of the peer apparatuses relating to the cooperative wireless transmission of the data block from the apparatus;
responsive to the listen-before-talk test indicating the first radio resources are available, initiate a transmission of the data block on the first radio resources during the early transmit opportunity;
responsive to the listen-before-talk test not indicating the first radio resources are available, listen for a second signal from at least one of the peer apparatuses, relating to the transmission of the data block from the at least one peer apparatuses, and initiate the transmission of the data block from the apparatus in accordance with the second signal from the at least one peer apparatuses by initiating the transmission less than or equal to a threshold length of time after the at least one peer apparatuses ends its transmission of the data block without performing a second listen-before-talk test after the at least one peer apparatuses ends its transmission of the data block.

* * * * *